No. 620,063. Patented Feb. 21, 1899.
H. VALDER.
WEIGHING SCALE.
(Application filed Oct. 15, 1898.)
(No Model.) 2 Sheets—Sheet 1.
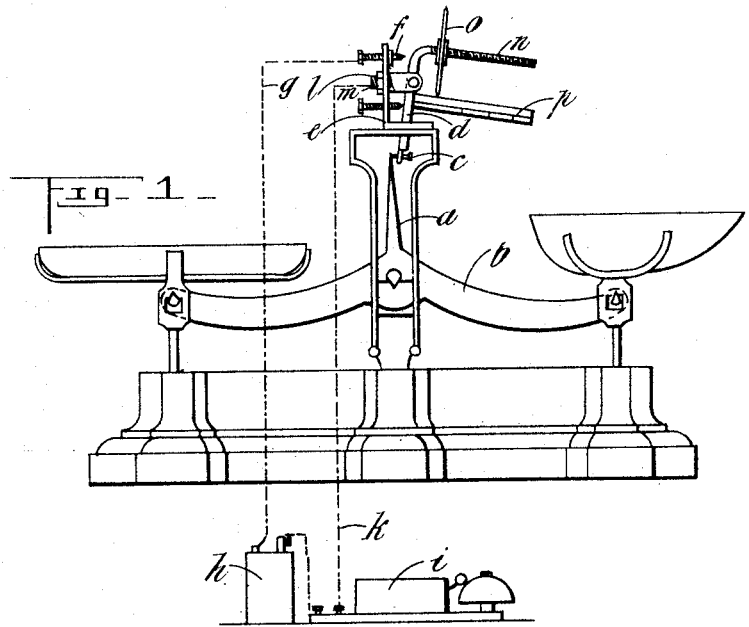
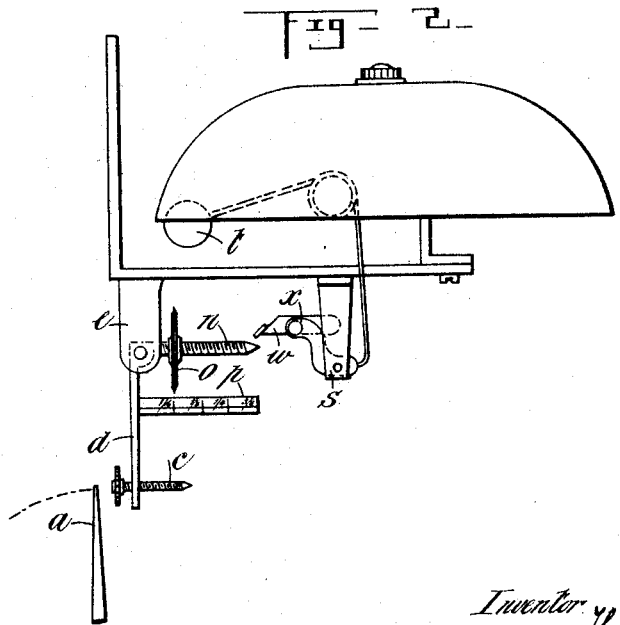
Witnesses
Inventor
Henry Valder
by Alexander & Co.
Attorneys
THE NORRIS PETERS CO., PHOTO-LITHO., WASHINGTON, D. C.

No. 620,063. Patented Feb. 21, 1899.
H. VALDER.
WEIGHING SCALE.
(Application filed Oct. 15, 1898.)
(No Model.) 2 Sheets—Sheet 2.
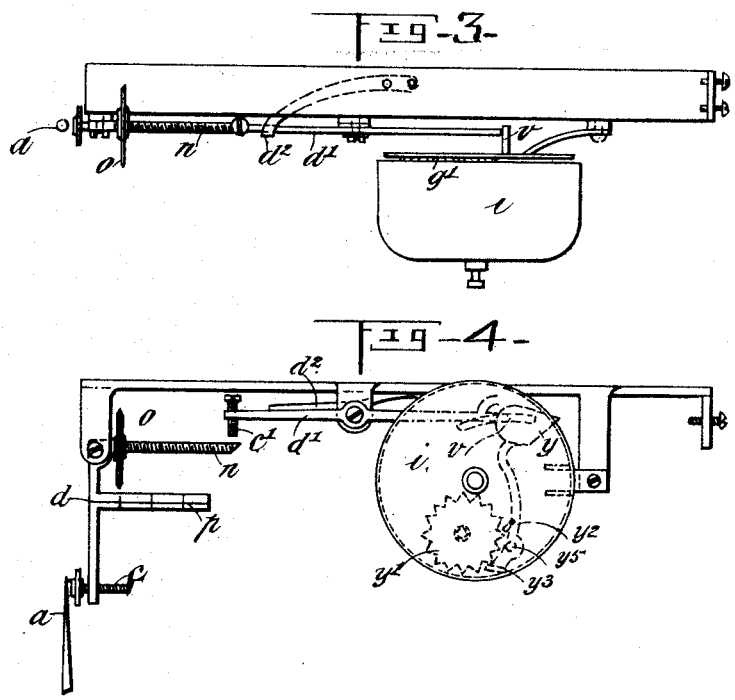

UNITED STATES PATENT OFFICE.

HENRY VALDER, OF WELLINGTON, NEW ZEALAND.

WEIGHING-SCALE.

SPECIFICATION forming part of Letters Patent No. 620,063, dated February 21, 1899.

Application filed October 15, 1898. Serial No. 693,822. (No model.)

*To all whom it may concern:*

Be it known that I, HENRY VALDER, a subject of the Queen of Great Britain, and a resident of 54 Lambton Quay, Wellington, New Zealand, have invented Improvements in or Relating to Weighing-Machines, Scales, and the Like, of which the following is a specification.

It is well known to retail salesmen and others that pointers and similar visual indicators usually employed upon scales and weighing-machines are insufficient to prevent loss through the carelessness or inadvertence of attendants, who often pay insufficient regard to the position of such indicators and give overweight.

The object of this invention is to cause a bell or other signal to sound when the article being weighed is equal to or exceeds a predetermined amount above the weight against which it is being balanced.

In carrying my invention into practice I employ a lever or trigger which is struck by any convenient part of the scale when moving under an equal or excess of weight in the scale-pan. The lever may either strike a bell direct, release a catch whereby a spring-driven bell is put in operation, or close the electrical circuit of an electromagnetic bell.

The mechanism requires but slight modification for any type of scale or machine, and for the sake of clearness I have shown the arrangement for all the kinds of bells above referred to in the accompanying drawings, wherein—

Figure 1 is a side elevation of an ordinary balance-scale in which an electromagnetic bell is used in connection with my invention. Fig. 2 is a side elevation of a bell and mechanism whereby a moving part of the scale causes it to be struck. Fig. 3 is a plan. Fig. 4 is a side elevation of a spring-driven bell and releasing mechanism.

Similar letters of reference indicate the same or corresponding parts throughout the figures.

Referring first to Fig. 1, the pointer $a$ is fixed upon the scale-beam $b$, and when the article being weighed equals or exceeds its counterbalance said pointer comes in contact with a regulating-screw $c$ upon a bell-crank lever $d$, pivoted upon a bracket $e$, whereby the bell-crank lever is vibrated and its upper end brought into contact with an insulated terminal pin $f$, to which is connected one wire $g$ of an electrical battery $h$, employed to drive the electromagnetic bell $i$. The opposite wire $k$ of the battery $h$ is connected by a nut $l$ to the pin $m$, upon which the bell-crank lever $d$ is pivoted in bracket $e$. The arm $n$ of the bell-crank lever $d$ is screwed, and a screwed balance-weight $o$ can be adjusted upon it to regulate the amount of overweight in the article being weighed necessary to vibrate the lever sufficiently to cause electrical circuit to be closed between the pins $f$ and $m$. A dial-staff $p$ upon the bell-crank lever $d$ serves as a guide in adjusting position of the balance-weight $o$.

In Fig. 2 the bell-crank lever is operated as in Fig. 1 and the end of arm $n$ contacts with a pawl $w$, pivoted upon the end of an arm $x$, fitted upon the rocking shaft $s$, which carries the bell-hammer $t$. Pawl $w$ is pivoted to allow return of the arm $n$.

In Figs. 3 and 4 the arm $n$ of bell-crank lever $d$ is arranged to engage adjusting-pin $c$ at the end of a straight lever $d'$, which is pivoted near its middle and returned to its normal position by a spring $d^2$. When vibrated against the pressure of spring $d^2$ by the scale-pointer which engages screw $c$, the opposite end of the lever $d'$ releases the spring-driven bell $i$, which it normally retains by engaging with a pin $v$, depending from the bell-hammer $y$. The bell-hammer $y$, which is pivoted at $y^5$, is vibrated by a spring motor-driven ratchet-wheel $y'$, which engages with pallets $y^2$ and $y^3$ upon the hammer-lever $y^4$. The end of lever $d'$ normally engages pin $v$ and prevents pallet $y^3$ from coming out of the ratchet-tooth with which it is in engagement; but when lever $d'$ is vibrated by the scale-pointer the pin $v$ is released and the bell allowed to ring. The end of the lever may be bifurcated, as shown, so that when vibrated by overweight upon the scale the bell is first released. A further movement of the lever $d$ brings the other fork into contact with pin $v$, and the bell is stopped. A still further movement of the lever releases the bell, which will then ring continuously until the overweight is removed from the scale.

It will be observed that my invention is not a part of the weighing-machine proper, but is additional thereto. It can be readily attached to any weighing-machine with but slight modification, and is therefore capable of being made and sold as a separate article of manufacture to be applied to weighing-machines already in use.

Having now particularly described and ascertained the nature of my said invention and in what manner the same is to be performed, I declare that what I claim is—

1. As a new article of manufacture, an attachment for a scale weighing-machine, to indicate when a predetermined weight has been placed in the scale-pan, said attachment comprising a bell, means for ringing the same, a lever normally disconnected from the weighing-machine but having an arm which depends into the path of a moving part of said machine, an adjustable screw in the end of said arm adapted to be struck by the moving part of the machine and cause the bell to ring, and an adjustable weight on the other arm of the lever, whereby the amount of the predetermined weight can be regulated, substantially as described.

2. As a new article of manufacture, an attachment for a scale weighing-machine to indicate when a predetermined weight has been placed in the scale-pan, said attachment comprising a bell, means for ringing the same, a bent lever normally disconnected from the weighing-machine but having an arm which depends into the path of a moving part of the weighing-machine scale-beam, an adjusting-screw carried in the end of said arm and adapted to be struck by the scale-beam at a certain point in its movement to cause the bell to ring, a dial-staff attached to said arm and parallel with the other arm of the lever, and an adjustable weight movable along said other arm adjacent to the dial-staff, whereby the amount of the predetermined weight can be accurately regulated, substantially as described.

In witness whereof I have hereunto set my hand in the presence of two witnesses.

HENRY VALDER.

Witnesses:
B. E. HUGHES,
A. S. COLLINS.